(12) United States Patent
Yamazaki

(10) Patent No.: US 12,496,004 B2
(45) Date of Patent: Dec. 16, 2025

(54) CONTROL METHOD, CONFERENCE SYSTEM, AND NON-TRANSITORY RECORDING MEDIUM

(71) Applicant: Konica Minolta, Inc., Tokyo (JP)

(72) Inventor: Kohei Yamazaki, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 269 days.

(21) Appl. No.: 18/332,000

(22) Filed: Jun. 9, 2023

(65) Prior Publication Data

US 2023/0397868 A1   Dec. 14, 2023

(30) Foreign Application Priority Data

Jun. 9, 2022 (JP) ................. 2022-093606

(51) Int. Cl.
*A61B 5/16* (2006.01)
*A61B 5/00* (2006.01)
*G06V 40/16* (2022.01)
*H04N 7/15* (2006.01)

(52) U.S. Cl.
CPC ............ *A61B 5/165* (2013.01); *A61B 5/0077* (2013.01); *A61B 5/4803* (2013.01); *G06V 40/174* (2022.01); *H04N 7/15* (2013.01); *A61B 2503/12* (2013.01)

(58) Field of Classification Search
CPC ..... A61B 5/165; A61B 5/0077; A61B 5/4803; A61B 2503/12; G06V 40/174; H04N 7/15
See application file for complete search history.

(56) References Cited

U.S. PATENT DOCUMENTS

| 11,228,625 B1* | 1/2022 | Libin | H04L 65/765 |
| 2013/0169742 A1* | 7/2013 | Wu | H04L 51/10 |
| | | | 348/E7.083 |
| 2017/0127021 A1* | 5/2017 | Frank | H04N 13/204 |
| 2020/0184203 A1* | 6/2020 | Anders | G06N 7/00 |
| 2021/0076002 A1* | 3/2021 | Peters | H04N 7/152 |
| 2025/0021937 A1* | 1/2025 | Ito | G06Q 10/10 |

FOREIGN PATENT DOCUMENTS

| JP | 2016-012216 | 1/2016 |
| JP | 2020-154673 | 9/2020 |

* cited by examiner

*Primary Examiner* — Stella L. Woo
(74) *Attorney, Agent, or Firm* — BakerHostetler

(57) ABSTRACT

A control method of a conference system, comprises acquiring information on behavior of a participant in a conference; and evaluating, during the conference, psychological safety of the participant based on the acquired information. A conference system comprises: an acquisition unit that acquires information on behavior of a participant in a conference; and an evaluation unit that evaluates psychological safety of the participant based on the information acquired by the acquisition unit during the conference. A non-transitory recording medium stores a computer readable program to be executed by a hardware processor in a computer. The computer readable program causes the hardware processor to acquire information on behavior of a participant in a conference and evaluate psychological safety of the participant based on the acquired information during the conference.

19 Claims, 14 Drawing Sheets

SPEECH EVALUATION INFORMATION 15

| PARTICIPANT ATTRIBUTE | SPEECH CONTENT | EVALUATION VALUE |
|---|---|---|
| SUPERVISOR | This is not good. | -10 |
| SUPERVISOR | What do you do with this? | -10 |
| SUPERVISOR | Don't you know that? | -15 |
| ⋮ | ⋮ | ⋮ |
| SUBORDINATE | I'm sorry. (silent after the speech) | -15 |
| SUBORDINATE | I don't know. (silent after the speech) | -15 |
| SUBORDINATE | I can't do it. (silent after the speech) | -15 |
| ⋮ | ⋮ | ⋮ |
| SUPERVISOR/ SUBORDINATE | SILENCE FOR A PREDETERMINED TIME | -2 |

FIG. 4

CONFERENCE INFORMATION 14

| TIME (H:M:S) | PARTICIPANT | TYPE OF BEHAVIOR | CONTENT OF SPEECH | EMOTION | EVALUATION VALUE |
|---|---|---|---|---|---|
| ⋮ | ⋮ | ⋮ | ⋮ | ⋮ | ⋮ |
| 11:49:09 | A | STATEMENT (ASK A QUESTION) | How is the progress of the work? | NORMAL MIND | +2 |
| 11:49:11 | B | STATEMENT (REPORT) | Progress is ****. | NORMAL MIND | +1 |
| 11:49:21 | A | STATEMENT (ASK A QUESTION) | If you keep working, you may run into probrems around here. what do you think? | NORMAL MIND | +2 |
| 11:49:31 | B | EXPRESSION CHANGE | | CONFUSION | -5 |
| 11:50:01 | B | STATEMENT (REPORT) | I will do my best to handle. | ANXIETY | -10 |

SPEECH EVALUATION INFORMATION 15

| PARTICIPANT ATTRIBUTE | SPEECH CONTENT | EVALUATION VALUE |
|---|---|---|
| SUPERVISOR | This is not good. | -10 |
| SUPERVISOR | What do you do with this? | -10 |
| SUPERVISOR | Don't you know that? | -15 |
| ⋮ | ⋮ | ⋮ |
| SUBORDINATE | I'm sorry. (silent after the speech) | -15 |
| SUBORDINATE | I don't know. (silent after the speech) | -15 |
| SUBORDINATE | I can't do it. (silent after the speech) | -15 |
| ⋮ | ⋮ | ⋮ |
| SUPERVISOR/ SUBORDINATE | SILENCE FOR A PREDETERMINED TIME | -2 |

FIG. 5B

EMOTION EVALUATION VALUE 16

| EMOTION | TYPE OF BEHAVIOR | EVALUATION VALUE |
|---|---|---|
| PLEASURE | | +5 |
| JOY | | +5 |
| NORMAL MIND | | 0 |
| NORMAL MIND | STATEMENT (REPORT) | +1 |
| NORMAL MIND | STATEMENT (ASK A QUESTION) | +2 |
| ⋮ | ⋮ | ⋮ |
| TENSION | | -5 |
| CONFUSION | | -5 |
| ANXIETY | | -10 |
| ⋮ | ⋮ | ⋮ |
| FRUSTRATION | | -10 |

FIG. 6

EVALUATION VALUE INFORMATION 17

|  | EVALUATION VALUE |
|---|---|
| WHOLE CONFERENCE | 58 |
| PARTICIPANT A | 65 |
| PARTICIPANT B | 58 |
| PARTICIPANT C | 51 |

FIG. 9

CONFERENCE INFORMATION 14

| TIME (H:M:S) | PARTICIPANT | TYPE OF BEHAVIOR | CONTENT OF SPEECH | EMOTION | EVALUATION VALUE |
|---|---|---|---|---|---|
| ⋮ | ⋮ | ⋮ | ⋮ | ⋮ | ⋮ |
| 11:49:09 | A | STATEMENT (ASK A QUESTION) | How is the progress of the work? | NORMAL MIND | +2 |
| 11:49:11 | B | STATEMENT (REPORT) | Progress is ****. | NORMAL MIND | +1 |
| 11:49:21 | A | STATEMENT (ASK A QUESTION) | If you keep working, you may run into probrems around here. what do you think? | NORMAL MIND | +2 |
| 11:49:31 | B | EXPRESSION CHANGE | | CONFUSION | -5 |
| 11:50:01 | B | STATEMENT (REPORT) | I will do my best to handle. | ANXIETY | -10 |
| 11:50:10 | A | STATEMENT (ASK A QUESTION) | Would you need any help? | NORMAL MIND | +2 |
| 11:50:12 | B | EXPRESSION CHANGE | | PLEASURE | +5 |
| 11:50:15 | B | STATEMENT (REPORT) | Yes, please. | PLEASURE | +5 |

Ta

CONTROL METHOD, CONFERENCE SYSTEM, AND NON-TRANSITORY RECORDING MEDIUM

This application claims priority to Japanese patent application No. 2022-093606 filed on Jun. 9, 2022, the disclosure of which is incorporated herein in its entirety.

BACKGROUND

Technological Field

The present invention relates to a control method, a conference system, and a non-transitory recording medium. The present invention particularly relates to a technique for supporting a conference in which multiple participants participate.

Description of the Related Art

Conventionally, there has been known a conference system in which remark contents in a conference are recorded in a conference database and a remark of a speaker is evaluated. This known technique is introduced for example in Japanese Patent Application Laid-Open No. JP 2020-154673 A (hereafter, document 1). According to the known technique according to document 1, this conference system analyzes the conference content acquired from the conference database, and classifies individual remarks made in the conference into positive, negative, and neutral. The conference system cuts out a conversation from the neutral remark to the next neutral remark as a minimum conversation. When the minimum conversation includes more positive remarks than negative remarks, the conference system evaluates the neutral remark as a remark that contributed to the excitement of the conference and provides 3 points to the neutral remark. When the minimum conversation includes more positive remarks than negative remarks, the conference system evaluates the neutral remark as a remark that contributed to the excitement of the conference and provides −2 points to the neutral remark.

Conventionally, a conference analyzing device that calculates a degree of excitement of a conference on the basis of conference data in which voices and the like are recorded is also known. This known technique is introduced for example in Japanese Patent Application Laid-Open No. JP 2016-12216 A (hereafter, document 2). According to the known technique according to document 2, this conference analyzing device calculates the degree of excitement of the conference as an absolute evaluation value based on the characteristic amount of the conference data in which voices and the like are recorded. After the absolute evaluation value is calculated, the conference analyzing device corrects the absolute evaluation value. Thus, the conference analyzing device calculates the degree of excitement as a relative evaluation value.

In recent years, in many companies, attention has been paid to psychological safety, which is an environment in which everyone can talk without hesitation. Psychological safety refers to a state in which people can express their ideas and feelings to anyone without anxiety in an organization. Psychological safety has become an important factor in increasing an organization's productivity. In an organization such as a company, a conference is one of situations in which psychological safety is particularly likely to decrease. When the psychological safety decreases in a conference, a participant feels uneasy to speak. Then, the participant may hesitate to speak his or her idea or feeling. As a result, the productivity of the organization cannot be increased. In the worst case, a mistake may be missed or a failure that could be prevented may occur. Therefore, ensuring psychological safety during a conference is important in prompting participants to speak freely.

The aforementioned known technique according to document 1 is to evaluate a remark of a speaker after it has occurred. The known technique according to document 1 does not evaluate the psychological safety of the participants while the conference is in progress. Also, according to the known technique according to document 2, the degree of excitement of the conference is calculated as a relative evaluation value after the conference. The known technique according to document 1 does not evaluate the psychological safety of the participants while the conference is in progress. More specifically, neither the document 1 nor the document 2 is able to control a decrease in the psychological safety during the conference. Then, the participant may hesitate to speak his or her idea or feeling as he or she feels unsafe to give a speech.

SUMMARY

The present invention is intended to solve the above problems. Thus, the present invention is intended to provide a control method, a conference system, and a non-transitory computer medium that are enabled to detect a decrease in psychological safety during a conference.

First, the present invention is directed to a control method.

To achieve the above-described object, a control method of one aspect of the present invention is a method for controlling a conference system, the method including: an acquisition step of acquiring information on behavior of a participant in a conference; and an evaluation step of evaluating, during the conference, psychological safety of the participant based on the information acquired in the acquisition step.

Second, the present invention is directed to a conference system.

According to one aspect of the present invention, the conference system comprises: an acquisition unit that acquires information on behavior of a participant in a conference; and an evaluation unit that evaluates psychological safety of the participant based on the information acquired by the acquisition unit during the conference.

Third, the present invention is directed to a non-transitory recording medium storing a computer readable program to be executed by a hardware processor in a computer.

According to one aspect of the present invention, the computer readable program causes the hardware processor executing the computer readable program to: acquiring information on behavior of a participant in a conference; and evaluating psychological safety of the participant based on the acquired information during the conference.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 4 illustrates an example of conference information;

FIGS. 5A and 5B illustrate an example of remark evaluation information and emotion evaluation information;

FIG. 6 illustrates an example of evaluation value information;

FIG. 9 illustrates an example of the conference information after the conference progresses;

DETAILED DESCRIPTION OF EMBODIMENTS

Hereinafter, one or more embodiments of the present invention will be described with reference to the drawings. However, the scope of the invention is not limited to the disclosed embodiments.

(Conference System)

Figure 1:
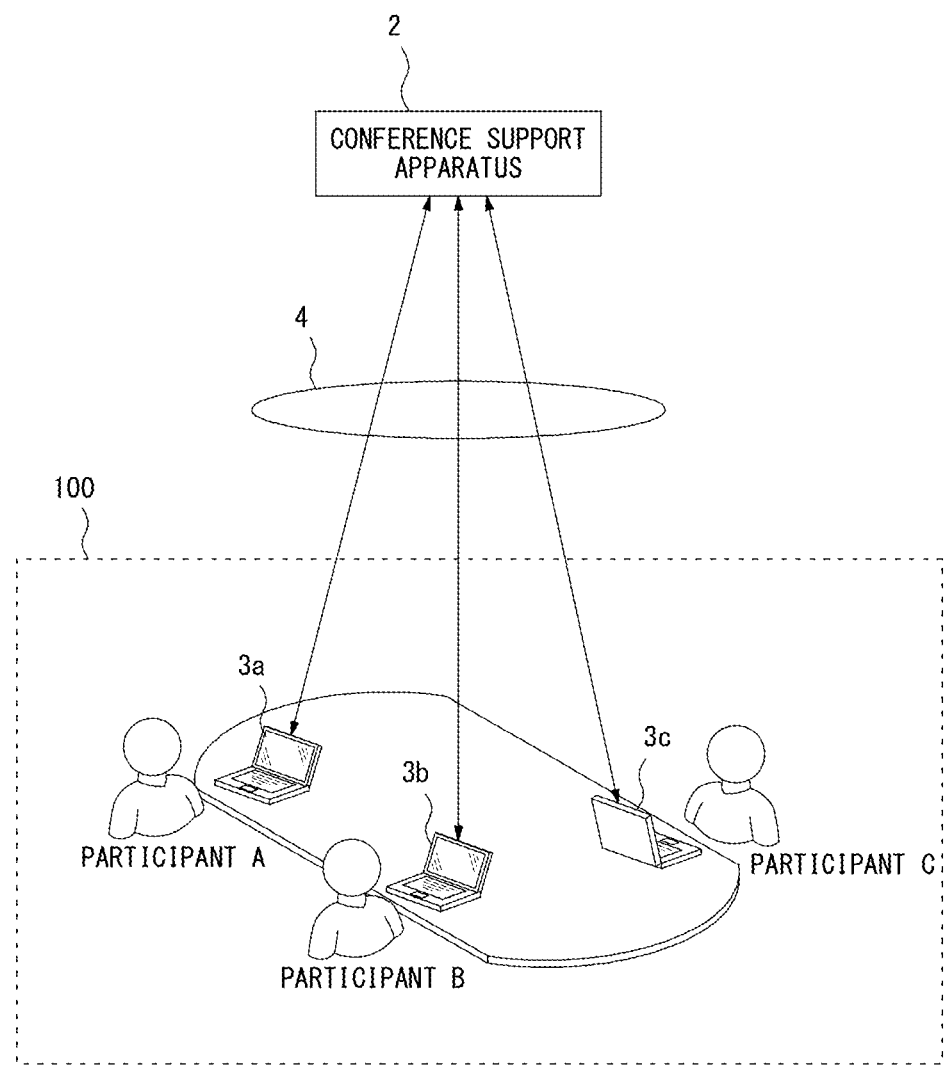
FIG. 1 illustrates an exemplary configuration of a conference system.

FIG. 1 illustrates an exemplary structure of an inkjet conference system 1 in which the one embodiment of the present invention may be practiced. The conference system 1 is a system that supports a conference held by multiple participants A, B, and C in a conference room 100, for example. The conference system 1 includes information processing terminals 3a, 3b, and 3c carried by the participants A, B, and C, respectively, and a conference support apparatus 2. The information processing terminals 3a, 3b, and 3c and the conference support apparatus 2 communicate with each other via a communication network 4. The communication network 4 is a network including a local network such as a local area network (LAN) and a wide area network such as the Internet. The conference support apparatus 2 collects real time information during the conference from each of the information processing terminals 3a, 3b, and 3c via the communication network 4. The conference support apparatus 2 then evaluates the psychological safety of the conference being held in the conference room 100. The conference support apparatus 2 evaluates the psychological safety in real time during the conference. Thus, changes in psychological safety during the conference can be recorded in time series. Along with that, in a case where the psychological safety decreases, support for improving the psychological safety can be provided.

The information processing terminals 3a, 3b, and 3c are formed from devices such as personal computers (PC), tablet terminals, and/or smartphones. In the information processing terminals 3a, 3b, and 3c, an application cooperating with the conference support apparatus 2 is installed in advance. The participants A, B, and C operate their own information processing terminals 3a, 3b and 3c at the start of the conference to start the application. Thus, each of the information processing terminals 3a, 3b, and 3c collects information about the behavior of each of the participants A, B, and C during the progress of the conference, and transmits the information to the conference support apparatus 2.

(Conference Support Apparatus)

Figure 2:
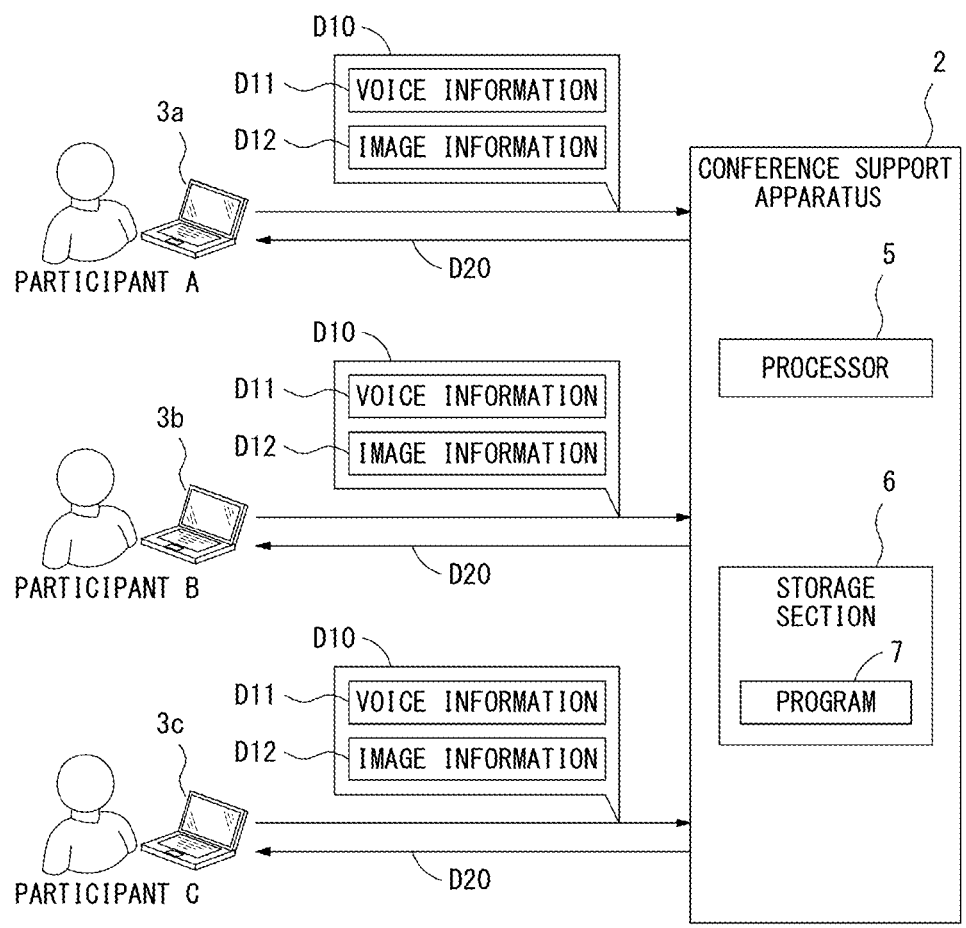
FIG. 2 illustrates a hardware configuration of a conference support apparatus.

FIG. 2 illustrates a hardware configuration of the conference support apparatus 2. The conference support apparatus 2 acquires information D10 on behaviors of the participants A, B, and C from the information processing terminals 3a, 3b, and 3c, respectively. The conference support apparatus 2 evaluates the psychological safety of the conference as a whole and the psychological safety of the participants A, B, and C during the conference, based on the information D10 on the behaviors of the participants A, B, and C acquired from the information processing terminals 3a, 3b, and 3c.

As illustrated in FIG. 2, the conference support apparatus 2 includes a processor 5 and a storage section 6. The processor 5 is a hardware processor that reads and executes a computer readable program 7 stored in the storage section 6. The processor 5 is formed from an arithmetic processing unit such as a CPU (central processing unit). The storage section 6 is a storage device formed from a hard disk drive (HDD), a solid-state drive (SSD), a semiconductor memory, or the like. In addition to the program 7 described above, various kinds of information can be stored in the storage section 6.

The conference support apparatus 2 evaluates the psychological safety during the conference by the processor 5 executing the program 7. The psychological safety indicates a state in which any one of the participants A, B, and C can express his or her idea and/or feeling with less worry during the conference. Therefore, it is important to ensure the psychological safety in the conference in order to actively exchange opinions and effectively utilize various ideas. For example, in a case where the emotion of each of the participants A, B, and C during the conference is enjoyment, joy, or the like, it can be said that each of the participants A, B, and C is in a psychological state in which he or she can easily speak. It can be determined that the psychological safety is high. On the other hand, when the emotion of each of the participants A, B, and C during the conference is in a state of tension, anxiety, or perplexity, and a new opinion or proposal does not occur, it can be determined that the psychological safety is low. As described above, the psychological safety in the conference increases or decreases depending on the emotion of each of the participants A, B, and C. It can be said that the emotion of each of the participants A, B, and C appears in the behavior of each of the participants A, B, and C during the conference.

The conference support apparatus 2 calculates an evaluation value regarding the psychological safety in real time as an index indicating whether or not any one of the participants A, B, and C is in a state of being able to express safely his or her idea and/or feeling. The evaluation value regarding the psychological safety is calculated based on the behavior information D1 of each of the participants A, B, and C that is sequentially acquired during the conference. For example, the conference support apparatus 2 calculates the evaluation value that indicates a higher value as the psychological safety becomes higher and indicates a lower value as the psychological safety becomes lower. The evaluation value that the conference support apparatus 2 sequentially calculates during the conference may decrease to a predetermined value or less. In this case, the conference support apparatus 2 determines that none of the participants A, B, and C is in a state in which he or she can express his or her idea and/or feeling without anxiety. Then, the conference support apparatus 2 notifies the participants A, B, and C that the psychological safety has decreased during the conference. Thus, it is possible to prevent the conference from proceeding while the psychological safety is lowered.

For example, in the present embodiment, as shown in FIG. 2, the information D10 regarding the behavior of each of the participants A, B, and C includes voice information D11 and image information D12. An audio input unit such as a microphone and an image photographing unit such as a camera are provided with the respective information processing terminals 3*a*, 3*b*, and 3*c*. An application started launched on each of the information processing terminals 3*a*, 3*b*, and 3*c* brings the audio input unit and the image photographing unit into operation. When the participant A, B, or C speaks during the conference, the application inputs voice via the audio input unit, and generates the voice information D11 in which the speeches of the participant A, B, or C is recorded. The application acquires an image photographed by the image photographing unit during the conference and generates the image information D12 obtained by photographing the expression and/or the attitude of the corresponding participant A, B or C. Then, the application uses the communication function of the information processing terminal 3*a*, 3*b*, or 3*c* to transmit information including the voice information D11 and the image information D12 to the conference support apparatus 2 as the information D10 related to the behaviors of the respective participants A, B, and C. As a result, the conference support apparatus 2 can evaluate psychological safety based on the speeches, expressions, attitudes, and the like of the participants A, B, and C during the conference.

The information D10 on the behavior may be formed with only the voice information D11 or may be formed with only the image information D12. The information D10 on the behavior may include information other than the voice information D11 or the image information D12. Examples of the information other than the voice information D11 or the image information D12 include heart rate information or stress information that can be acquired from a wearable terminal such as a smart watch worn by each of the participants A, B, and C.

(Function of Conference Support Apparatus)

Figure 3:
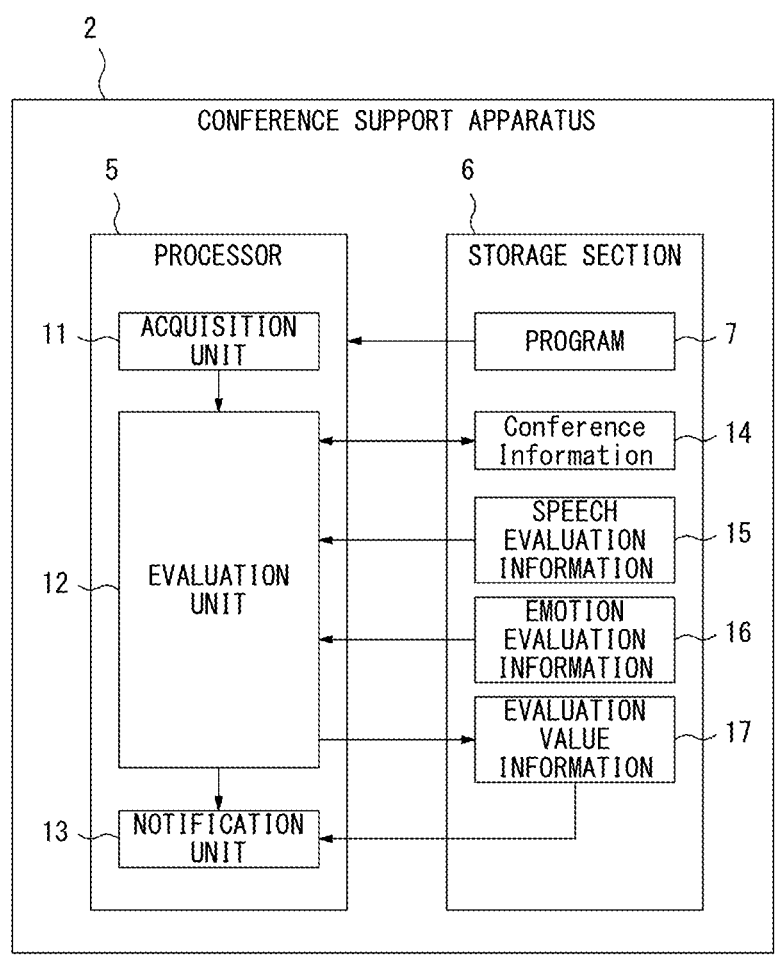
FIG. 3 is a block diagram illustrating a functional configuration of the conference support apparatus.

FIG. 3 is a block diagram illustrating a functional configuration of the conference support apparatus 2. As illustrated in FIG. 3, the processor 5 of the conference support apparatus 2 serves as an acquisition unit 11, an evaluation unit 12, and a notification unit 13 by executing the program 7.

The acquisition unit 11 acquires, in real time, the information D10 on behavior of each of the participants A, B, and C from the information processing terminals 3*a*, 3*b*, and 3*c*, respectively, during the conference. As described above, the information D10 on the behavior of each participant A, B, and C acquired by the acquirer 11 includes the voice information D11 and the image information D12. However, each of the participants A, B, and C may not be speaking in the conference. In that case, the information D10 acquired by the acquisition unit 11 may not include the voice information D11.

The evaluation unit 12 evaluates the psychological safety during the conference based on the information D10 on the behavior of each of the participants A, B, and C acquired by the acquisition unit 11. Next, the operation of the evaluation unit 12 is described in detail.

First, the evaluation unit 12 analyzes the voice information D11 and the image information D12 included in the information D10 on the behavior of each of the participants A, B, and C. Then, the evaluation unit 12 records the analysis result. The analysis result is stored by being accumulated in the conference information 14. FIG. 4 illustrates an example of the conference information 14. As illustrated in FIG. 4, the conference information 14 is information in which the behavior of each participant A, B, and C during the conference is recorded in time series. The information on the behavior of each participant A, B, and C performed from the start of the conference to the end of the conference is accumulated in the conference information 14. In the conference information 14, the time at which the behavior was performed, the participant who performed the behavior, the type of the behavior, the content of speech when the behavior is speech, the emotion of the participant specified from the behavior, and the evaluation value are recorded.

When the information D10 on the behavior is acquired by the acquisition unit 11, the evaluation unit 12 identifies the current time and the participant who has performed the behavior. For example, the evaluation unit 12 designates which of the multiple information processing terminals 3*a*, 3*b*, and 3*c* is a sender of the information D10 on the behavior, thereby identifying the participant who has performed the behavior. The voice information D11 may be included in the information D10 on the behavior. In such a case, the evaluation unit 12 may perform a voiceprint analysis on the voice information D11 to identify the participant who has performed the behavior. Furthermore, the evaluation unit 12 may perform face recognition based on the image information D12 included in the information D10 on behavior to identify the participant who performed the behavior. Then, the evaluation unit 12 records the current time and the identified participant in the conference information 14.

In a case where the voice information D11 is included in the information D10 on the behavior, the evaluation unit 12 specifies that the type of the behavior is a speech. The evaluation unit 12 records the speech in the field of the type of behavior of the conference information 14.

In a case where the voice information D11 is included in the information D10 on the behavior, the evaluating unit 12 analyzes the voice information D11. The evaluation unit 12 converts the voice information D11 into text data and specifies the content of the speech. The evaluating unit 12 can specify whether the type of the speech is a report or a question by specifying the content of the speech. Then, the evaluation unit 12 records the specified content of the speech in the conference information 14.

The evaluation unit 12 analyzes the tone (tone of voice) at the time of the speech based on the voice information D11 to identify the emotion of the participant who had spoken. For example, the participant of the conference may speak while he or she is frustrated. In this case, the tone at the time of the speech becomes intense. On the other hand, when the participant speaks with a normal mind, the tone at the time of the speech becomes gentle. Therefore, the evaluation unit 12 can identify the emotion of the participant by analyzing the tone at the time of the speech. The emotions that can be identified by analyzing the tone include, for example, pleasure, joy, normal mind, frustration, tension, confusion, anxiety, and the like. However, the evaluation unit 12 may not be able to identify the emotion of the participant even when the evaluation unit 12 analyzes the tone at the time of the speech. When the emotion of the participant is enabled to be identified by analyzing the voice information D11, the evaluation unit 12 records the identified emotion in the conference information 14.

When analyzing the voice information D11, the evaluating unit 12 may perform natural language processing using artificial intelligence (AI). In this case, an engine that performs the AI analysis may be provided inside the evaluation unit 12. However, this is given not for limitation. The evaluation unit 12 may analyze the voice information D11 by using an AI analysis engine provided externally the conference support apparatus 2. If the AI is used for the analysis of the voice information D11, it is possible to improve the accuracy when specifying the content of the speech or the emotion by the machine learning of the AI. In addition, it is possible to reduce the frequency with which the emotion cannot be identified.

There are cases where the emotion of the participant can be identified not only from the tone at the time of the speech but also from the content of the speech. Therefore, the evaluation unit 12 may identify the emotion of the participant by considering not only the tone at the time of the speech but also the content of the speech.

The evaluation unit 12 analyzes the image information D12 included in the information D10 on the behavior. The evaluation unit 12 then determines whether or not the facial expressions and/or attitudes of the participants A, B, and C have changed. When it is detected that the expression and/or the attitude of one of the participants A, B and C is changed, the evaluation unit 12 identifies the emotion of the participant whose expression and/or the attitude is changed. When the participant of the conference is frustrated, for example, the facial expression of the participant shown in the image becomes steep. If the participant is in normal mind, the facial expression of the participant shown in the image is gentle. If the participant becomes anxious, the facial expression of the participant shown in the image changes to a subtle facial expression. Hence, by analyzing the image information D12, the evaluation unit 12 can identify the emotion according to the facial expression or the attitude of the participant. The emotions that can be identified by analyzing the image information D12 include, for example, pleasure, joy, normal mind, frustration, tension, confusion, and anxiety. However, the evaluation unit 12 may not be able to identify the emotion of the participant even still the image information D12 is analyzed. When the emotion of the participant can be identified by analyzing the image information D12, the evaluation unit 12 records the identified emotion in the conference information 14.

For analyzing the image information D12, the evaluation unit 12 may perform image analysis using AI as in the case of the voice information D11. When AI is used for the analysis of the image information D12, the frequency with which an emotion cannot be identified can be reduced by machine learning of AI. At the same time, it is possible to improve the accuracy in identifying the emotion.

The evaluation unit 12 calculates the evaluation value based on the information recorded in the conference information 14. The evaluation unit 12 refers to, for example, speech evaluation information 15 and emotion evaluation information 16 stored in advance in the storage section 6.

FIGS. 5A and 5B illustrate an example of the speech evaluation information 15 and the emotion evaluation information 16. FIG. 5A shows an example of the speech evaluation information 15. FIG. 5B shows an example of the emotion evaluation information 16.

As illustrated in FIG. 5A, the speech evaluation information 15 is information in which a participant attribute, a speech content, and the evaluation value are associated with each other. In the speech content of the speech evaluation information 15, a word that is generally said to lower psychological safety is registered. The participant attribute is information indicating an attribute of a participant who utters a word of the speech content. As the participant attribute, for example, information regarding a job type such as a supervisor or a subordinate is registered.

For example, when a supervisor and a subordinate are having a conference, it is assumed that the supervisor said to the subordinate "This is not good." In this case, the psychological safety of the subordinate is decreased. Therefore, in the speech evaluation information 15, as the speech of the supervisor, the speech such as "This is not good." is registered. "−10" is registered as the evaluation value corresponding to the speech content. The evaluation value has a negative value. This means that the psychological safety is decreased. Besides the aforementioned example, in the speech evaluation information 15, a speech content that lowers the psychological safety of the subordinate when the supervisor said is registered.

When the supervisor and the subordinate are having a conference, the subordinate said "I'm sorry" to the supervisor. It can be said that the psychological safety of the subordinate is decreased when the subordinate keeps silent for a predetermined time or longer after the speech. Therefore, the speech "I'm sorry" and the following silence are registered as a speech of the subordinate in the speech evaluation information 15. As the corresponding evaluation value, "−15" is registered. Besides the speech, in the speech evaluation information 15, the speech content with which it can be detected that the psychological safety of the subordinate has decreased is registered.

The silence for the predetermined time or longer is also registered in the speech evaluation information 15. The time during which no speech content is recorded in the conference information 14 is calculated and whether the calculated time is equal to or longer than the predetermined time is determined. Then, whether the silence has continued for a predetermined time or longer can be detected. For example, in the speech evaluation information 15 illustrated in FIG. 5A, the evaluation value "−2" is registered for the silence for the predetermined time or longer. This evaluation value represents a decrease in the psychological safety. Therefore, when the evaluation unit 12 detects the silence for the predetermined time or longer during the conference, the evaluation unit 12 assigns "−2" as the evaluation value for the silence.

It may not necessarily be said that the psychological safety is lowered in the silence during the conference. For example, when materials are distributed during the conference, each participant is silent for a certain period of time in order to read the materials. Such silence does not necessarily decrease the psychological safety. In a case where the silence period is equal to or longer than a predetermined time, for example, the evaluation unit 12 may determine, based on the voice information D11 acquired immediately before the silence, whether the psychological safety of each participant has decreased. Such configuration may be adopted. For example, the speech content immediately before the silence may be "I will distribute a material from now. Please look through." In this case, the evaluation unit 12 does not assign the evaluation value "−2" to the following silence. On the other hand, when the speech immediately before the silence is "This is not good," the evaluation unit 12 assigns the evaluation value "−2" to the following silence. The silence during the conference is then classified into a case in which the psychological safety is not decreased and a case in which the psychological safety is decreased.

As illustrated in FIG. 5B, the emotion evaluation information 16 is information in which the emotion of the participant and the evaluation value are associated with each other. In the emotion evaluation information 16, a different evaluation value may be registered according to a combination of an emotion and a type of behavior. For example, an evaluation value of "0" is registered for the calm mind. When the participant makes a statement (report) in a calm mind, "+1" is registered as an evaluation value. This is because, it is considered that a situation in which the participant can speak or report in the calm mind is easier for the participant to speak. When the participant speaks (ask a question) in the calm mind, "+2" is registered as the evaluation value. This is because, it is considered that a situation in which the participant speaks (ask a question) is easier for him or her question. That is, FIG. 5B shows an example asks that the psychological safety is evaluated higher in a case where the participant asks his/her question than in a case where he or she makes a simple report.

Furthermore, in a case where the emotion of the participant is joy or pleasure, in the emotion evaluation information 16, it is evaluated that he or she is in the psychological state in which it is easy for him or her to actively speak his/her opinion or the like. A positive value is then given as an evaluation value. In contrast, in a case where the emotion of the participant is tension, confusion, anxiety, irritation, or the like, it is evaluated that the psychological stability is low. Therefore, a negative value is given as an evaluation value.

When a new speech content is recorded in the conference information 14, the evaluation unit 12 determines whether the recorded speech content is registered in the speech evaluation information 15. As a result, when the speech content newly recorded in the conference information 14 is registered in the speech evaluation information 15, the evaluation unit 12 acquires an evaluation value corresponding to the speech content from the speech evaluation information 15. Then, the evaluation unit 12 records the evaluation value acquired from the speech evaluation information 15 in the conference information 14.

When the speech newly recorded in the conference information 14 is not registered in the speech evaluation information 15, the evaluation unit 12 refers to the emotion evaluation information 16 to obtain an evaluation value corresponding to the emotion recorded in the conference information 14. At this time, a combination of the emotion and the type of the behavior recorded in the conference information 14 may be registered in the emotion evaluation information 16. In such a case, an evaluation value corresponding to the combination is acquired. Then, the evaluation unit 12 records the evaluation value acquired from the emotion evaluation information 16 in the conference information 14.

The evaluation unit 12 can also acquire an evaluation value from each of the speech evaluation information 15 and the emotion evaluation information 16. In this case, the evaluation unit 12 calculates a total value by adding evaluation values acquired from the speech evaluation information 15 and the emotion evaluation information 16 and records the total value in the conference information 14.

As described above, the information on the behavior of the participant is recorded in the conference information 14. For example, according to the conference information 14 illustrated in FIG. 4, the participant A speaks in the calm mind at 11:15:09. The speech content of the participant A is "How is the progress of the work?" In response to this speech, the participant B says in the calm mind, "Progress is . . . at 11:15:11. Then, at 11:49:21, the participant A is making a statement to ask a question to the participant B in the calm mind. Since the emotions of the participants A and B are calm mind in all of these speeches, the evaluation values are positive values. Therefore, at the point of 11:49:21, the psychological safety in the conference tends to increase.

Thereafter, in the conference information 14, it is recorded that the expression change of the participant B is recognized at 11:49:31 and the emotion of the participant B is confused. Therefore, "−5" is recorded as an evaluation value, which indicates that psychological safety has decreased. At the following time 11:50:01, after a long silence, the participant B says "I will do my best to handle" with the anxious emotion. "−10" is recorded as an evaluation value. Hence, at the timing of 11:50:01, the participant B becomes anxious, and the psychological safety is significantly decreased.

The evaluation unit 12 updates the conference information 14 on the basis of the information D10 on the behavior of the participant. The evaluation unit 12 then calculates an evaluation value (first evaluation value) representing the psychological safety of the whole conference and an evaluation value (second evaluation value) representing the psychological security of each of the participants A, B, and C.

For example, the evaluation value indicating the psychological safety of the whole conference is an index for comprehensively evaluating the psychological safety of each of the participants A, B, and C. Therefore, the evaluation value indicating the psychological safety of the whole conference is calculated, for example, on the basis of every information recorded within a period going back from the current time by the predetermined time Ts among the information recorded in the conference information 14 as illustrated in FIG. 4. Specifically, it is assumed that the evaluation unit 12 records a new speech by the participant B in the conference information 14 at 11:50:01. The evaluation unit 12 adds all evaluation values within a predetermined time Ts from a predetermined time before the new speech is made to the current time (11:50:01), and calculates an evaluation value representing the psychological safety of the whole conference. All the evaluation values based on the emotions of the participants A, B, and C are added. Therefore, when the psychological safety of all of the participants A, B, and C is relatively high, the evaluation value representing the psychological safety of the whole conference gets also a high value. On the other hand, if the psychological safety of at least one participant is low, the evaluation value indicating the psychological safety of the whole conference does not get so high.

The evaluation value representing the psychological safety of each of the participants A, B, and C is an index for individually evaluating the psychological safety of each of the participants A, B, and C. Therefore, the evaluation value representing the psychological safety of each of the participants A, B, and C is calculated, for example, based on the information of each of the participants A, B, and C recorded within a period going back by the predetermined time Ts from the current time among the information recorded in the conference information 14 as illustrated in FIG. 4. Specifically, when the evaluation unit 12 records a new speech made by the participant B in the conference information 14 at 11:50:01, the evaluation unit 12 individually adds the evaluation value of each participant A, B, and C within the predetermined time Ts from a predetermined time before the new speech is made to the current time (11:50:01). Then, the evaluation unit 12 individually calculates an evaluation value representing the psychological safety of each of the participants A, B, and C.

Here, the predetermined time Ts is a time that can be arbitrarily set at the start of the conference. For example, in a case where the predetermined time Ts is set to 5 minutes, the evaluation unit 12 can calculate the first evaluation value and the second evaluation value based on the evaluation values recorded within a period going back 5 minutes from the current time among the evaluation values recorded in the conference information 14. The predetermined time Ts can also be set to 0 minutes. In this case, the first evaluation value and the second evaluation value are calculated based on the evaluation value recorded in the conference information 14 immediately before the current time.

Then, the evaluation unit 12 records the evaluation value representing the psychological safety of the whole conference and the evaluation value representing the psychological safety of each of the participants A, B, and C in evaluation value information 17 of the storage 6. FIG. 6 illustrates an example of the evaluation value information 17. As shown in FIG. 6, the evaluation value representing the psychological safety of the whole conference, the evaluation value representing the psychological safety of the participant A, the evaluation value indicating the psychological safety of the participant B, and the evaluation value indicating the psychological safety of the participant C at the current time are recorded in the evaluation value information 17. The evaluation value recorded in the evaluation value information 17 is sequentially updated during the conference. Therefore, by monitoring the evaluation value recorded in the evaluation value information 17, it is possible to detect, in real time, a decrease in any one of the psychological safety of the whole conference and the psychological safety of the participants A, B, and C during the conference.

Figure 7:
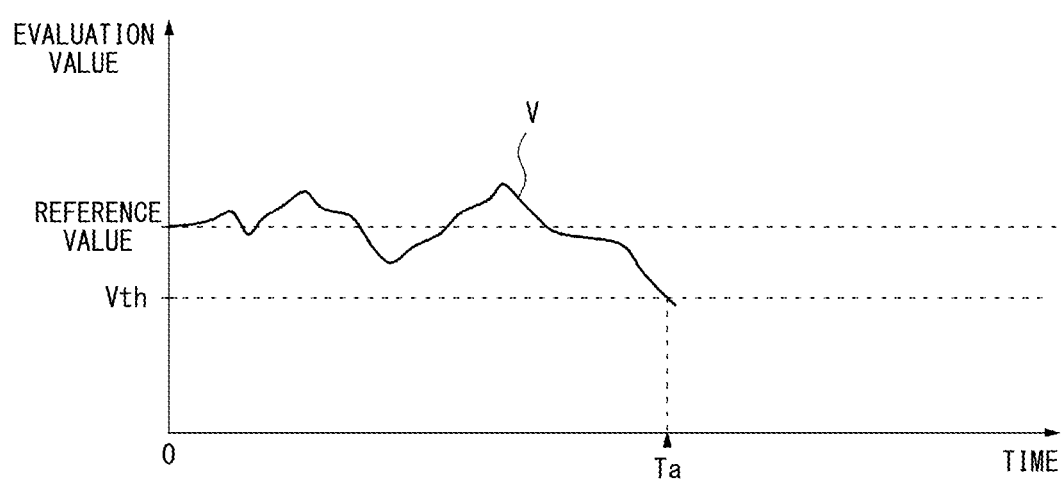
FIG. 7 illustrates an example of a change in an evaluation value during a conference.

FIG. 7 illustrates an example of a change in an evaluation value V during the conference. As shown in FIG. 7, the evaluation value V varies as the psychological safety of each of the participants A, B, and C varies during the conference. For example, the evaluation value V becomes a value lower than a predetermined reference value (for example, 0) when the psychological safety of each of the participants A, B, and C decreases. As the psychological safety of each of the participants A, B, and C increases, the evaluation value V becomes a value higher than the predetermined reference value. When the evaluation value recorded in the evaluation value information 17 is equal to or less than a predetermined value Vth, the evaluation unit 12 determines that the psychological safety during the conference has decreased. Such determination is performed individually for each evaluation value recorded in the evaluation value information 17. Therefore, if the evaluation value representing the psychological safety of the whole conference becomes equal to or lower than the predetermined value Vth, the evaluation unit 12 determines that the psychological safety of the whole conference has decreased. When the evaluation value representing the psychological safety of each of the participants A, B, and C is equal to or lower than the predetermined value Vth, the evaluation unit 12 determines that the psychological safety of each of the participants A, B, and C has decreased. For example, as illustrated in FIG. 7, the evaluation unit 12 can detect, in real time, that the psychological safety has decreased at a timing Ta when the evaluation value V becomes equal to or lower than the predetermined value Vth. When the evaluation unit 12 determines that the psychological safety has decreased during the conference, the evaluation unit 12 brings the notification unit 13 into operation.

The notification unit 13 notifies the participants A, B, and C of the conference that the psychological safety has decreased. The notification unit 13 may provide a notification to all of the participants A, B, and C. Alternatively, the notification may be provided to at least one of the participants A, B, and C. For example, the notification unit 13 may provide a notification to only the host of the conference or may provide a notification to only the supervisor.

The notification unit 13 provides a notification to an application running on each of the information processing terminals 3*a*, 3*b*, and 3*c*. The notification unit 13 adds information that enables to specify which of the whole conference or the participants A, B, and C has decreased in the psychological safety to the notification. Thus, the application is enabled to notify each of the participants A, B, and C of the conference that the psychological safety has decreased. For example, a display unit such as a color liquid crystal display is provided with each of the information processing terminals 3*a*, 3*b*, and 3*c*. The application displays a screen indicating that the psychological safety has decreased on the display unit of each of the information processing terminals 3*a*, 3*b*, and 3*c*. Thus, the application can provide a notification to each of the participants A, B, and C.

Figure 8A:
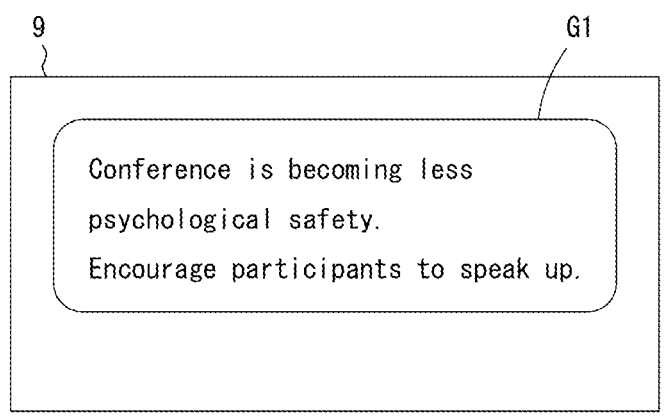
FIGS. 8A and 8B illustrate an example of a screen to be displayed on a display part of an information processing terminal.
Figure 8B:
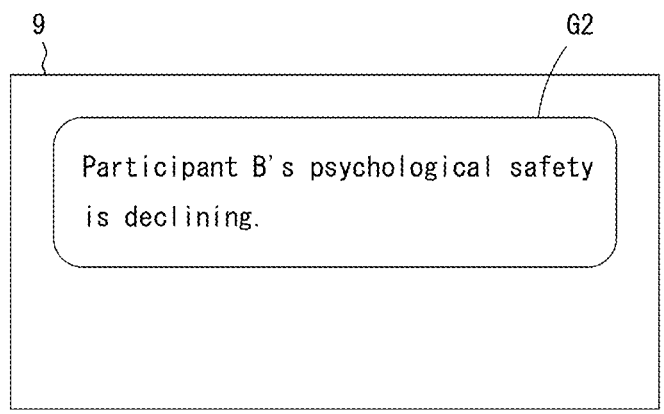

FIGS. 8A and 8B illustrate examples of a screen displayed on a display unit 9 of each of the information processing terminals 3*a*, 3*b*, and 3*c*. A screen G1 illustrated in FIG. 8A a illustrates an example of a notification screen displayed with the psychological security of the whole conference is decreased. The screen G1 is displayed on the information processing terminals 3*a*, 3*b*, and 3*c*. The participant who received the notification can switch the atmosphere of the conference so that other participants can easily speak, for example. The conference can be relaxed. Especially, the screen G1 illustrated in FIG. 8A is displayed in real time when it is determined that the psychological safety of the whole conference has decreased. Therefore, it is possible to prevent the conference from proceeding in a state in which the psychological safety of the whole conference is decreased, and the time from being wasted more than necessary.

A screen G2 of FIG. 8B illustrates an example of a notification screen shown when the psychological safety of a specific participant (for instance, the participant B) has decreased. The evaluation unit 12 may determine that the psychological safety of the specific participant (for example, the participant B) is decreased. In this case, the notification unit 13 provides a notification to the information processing terminals 3*a* and 3*c* of the participants (for instance, the participants A and C) other than the specific participant. Thus, the screen G2 illustrated in FIG. 8B is displayed on the display units 9 of the information processing terminals 3*a* and 3*c* of the other participants A and C. As a result, the participants A and C who have received the notification can change the atmosphere of the conference so that the participant B can easily speak. In particular, the screen G2 illustrated in FIG. 8B is displayed in real time when it is determined that the psychological safety of the participant B has decreased. Therefore, it is possible to prevent time from being wastefully consumed as the conference proceeds with the psychological safety of the participant B is decreased.

As an example, as in the conference information 14 illustrated in FIG. 4, a case where it is determined that the psychological safety of the participant B is decreased due to the speech of the participant B at 11:50:01 is described. In this case, the screen G2 shown in FIG. 8B is displayed on the display units 9 of the information processing terminals 3a and 3c of the participants A and C. The participants A and C can recognize in real time that the psychological safety of the participant B has decreased. In particular, in the case of the conference information 14 illustrated in FIG. 4, the participants A and C check the screen G2. Then, the speech of the participant B at 11:50:01 which is immediately before the display of the screen G2 is made in the state where the psychological safety is decreased. The participants A and C can know the speech is made with the anxious feeling. Therefore, the participants A and C can quickly make an action to enhance the psychological safety of the participant B by checking the screen G2 in real time.

FIG. 9 illustrates an example of the conference information 14 after the conference progresses. Conference information after the conference has progressed from the conference information 14 illustrated in FIG. 4 is recorded in the conference information 14 in FIG. 9. In this example, the screen G2 shown in FIG. 8B is displayed on the information-processing terminals 3a and 3c of the participants A and C at the timing Ta. Along with the display of the screen G2, at 11:50:12, the participant A asks the participant B "Would you need any help?" to offer the support. In the conference information 14, a change in the facial expression of the participant B is detected after the participant A speaks. In the conference information 14, the emotion of the participant B is changed from anxiety to joy, and the psychological safety is increased. Then, the participant B says "Yes, please" with the emotion of joy together with the change in the facial expression. The psychological safety of the participant B has further increased through this speech. Thereafter, the participants A and B proceed with the conference on how to deal with the problem while discussing with each other.

For example, in the conference information 14 shown in FIG. 4, when the psychological safety of the participant B decreases at the time 11:50:01, the conference support apparatus 2 may not provide any support to the other participants A and C. In this case, after the psychological safety is decreased, the participant B should have fallen into a situation where the participant B has to consider how to deal with the problem by him/herself in the anxiety state. However, when the psychological safety of the participant B decreases at 11:50:01, the conference support apparatus 2 of the present embodiment notifies the other participants A and C that the psychological safety of the participant B has decreased. The other participants A and C can then hear the points of anxiety and the like from the participant B and give advice on them immediately and appropriately. The other participants A and C can make the participant B feel reassured and enhance the psychological safety. As a result, the conference becomes active, and it is possible to draw effective ideas from the participant B.

Figure 10:
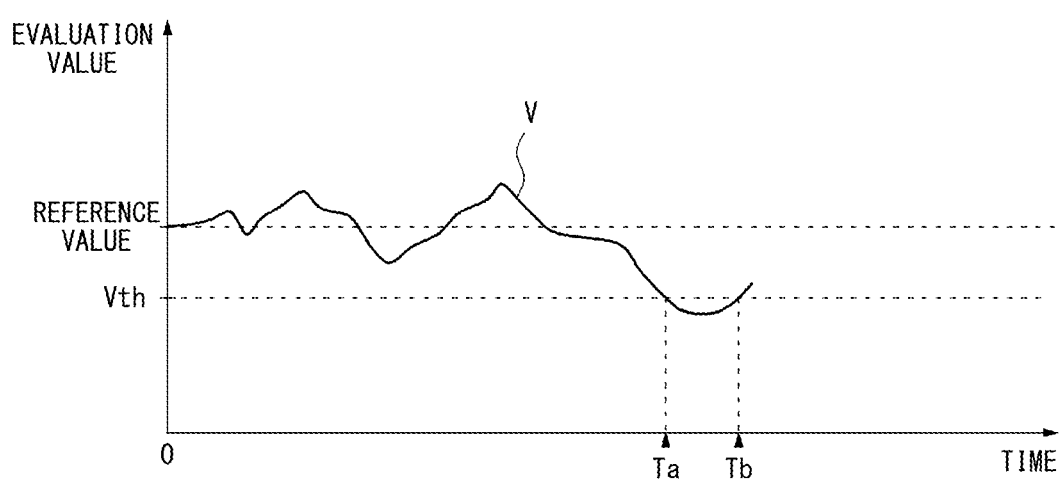
FIG. 10 illustrates an example of a subsequent change in the evaluation value during the conference.

FIG. 10 illustrates an example of a subsequent change in an evaluation value V during the conference. For example, as shown in FIG. 10, the evaluation value V becomes equal to or smaller than a predetermined value Vth at timing Ta, and it is detected that the psychological safety is decreased. As described above, the participant of the conference is then notified that the psychological safety has decreased. The participant who receives the notification makes an action to enhance the psychological safety during the conference. As a result, the evaluation value V representing the psychological safety rises thereafter, and for example, the evaluation value V becomes a value higher than the predetermined value Vth at timing Tb. Thus, the conference proceeds with high psychological safety.

In the above description, an example has been described in which the applications running on the information processing terminals 3a, 3b, and 3c display the screens G1 and G2 on the display units 9 of the information processing terminals 3a, 3b, and 3c to notify the participants A, B, and C that the psychological safety has decreased. However, the way of the notification by the application is not necessarily limited to the example in which the screen is displayed on the display units 9 of the information processing terminals 3a, 3b, and 3c. For example, each of the information processing terminals 3a, 3b, and 3c is provided with a voice output unit for outputting voice, such as a speaker. Therefore, a structure may be adopted in which the application drives the voice output units of the information processing terminals 3a, 3b, and 3c and performs notification to the participants A, B, and C by voice.

(An Example of Operations of the Conference Support Apparatus)

Figure 11:
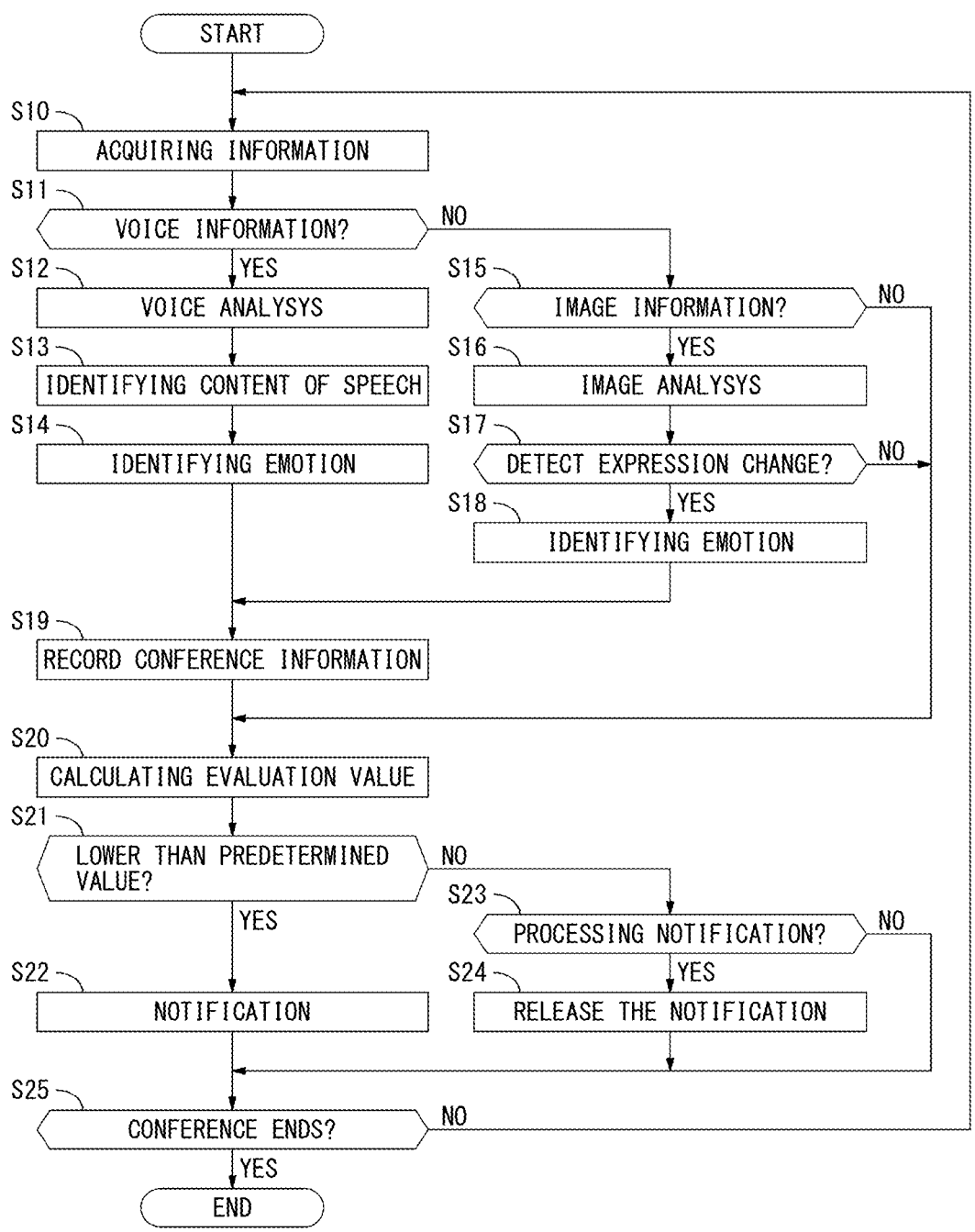
FIG. 11 is a flowchart illustrating an example of a processing procedure in the conference support apparatus.

Next, a detailed processing procedure in the conference support apparatus 2 will be described. FIG. 11 is a flowchart illustrating an example of a processing procedure in the conference support apparatus 2. This processing is performed when the processor 5 of the conference support apparatus 2 executes the program 7. After starting this process, the conference support apparatus 2 acquires information D10 on the behavior from the information processing terminals 3a, 3b, and 3c of the participants A, B, and C (step S10). The conference support apparatus 2 determines whether the voice information D11 is acquired (step S11). When the voice information D11 is acquired (when a result of step S11 is YES), the conference support apparatus 2 analyzes the voice information D11 (step S12). Thus, the conference support apparatus 2 specifies the content of the speech (step S13). The conference support apparatus 2 further identifies the emotion of the participant who has spoken (step S14).

When the voice information D11 is not included in the information D10 on the behavior (when a result of step S11 is NO), the conference support apparatus 2 determines whether the image information D12 is acquired (step S15). When the voice information D11 is acquired (when a result of step S15 is YES), the conference support apparatus 2 analyzes the image information D12 (step S16). The conference support apparatus 2 then determines whether a change in facial expression of the participant is detected (step S17). As a result, when a change in the facial expression of the participant is detected (when a result of step S17 is YES), the conference support apparatus 2 identifies the emotion of the participant based on the changed facial expression (step S18). When the image information D12 is not acquired (when a result of step S15 is NO), or when a change in the facial expression of the participant is not detected (when a result of step S17 is NO), the processing performed by the conference support apparatus 2 proceeds to step S20.

The conference support apparatus 2 may be able to identify the emotion of the participant based on the information acquired in step S10. In this case, the conference support apparatus 2 records various kinds of information in the conference information 14 and updates the conference information 14 (step S19).

Next, the conference support apparatus 2 calculates the evaluation value V representing the current psychological safety based on the current conference information 14 (step S20). As shown in FIG. 6, the evaluation value representing the psychological safety of the whole conference and the evaluation value representing the psychological safety of each of the participants A, B, and C of the conference are calculated. The conference support apparatus 2 then determines whether or not the calculated evaluation value V is equal to or smaller than the predetermined value Vth (step S21). This determination is made for each of the evaluation value representing the psychological safety of the conference as a whole and the evaluation value indicating the psychological safety of each of the participants A, B, and C. When at least one of the evaluation values is equal to or smaller than the predetermined value (when a result of step S21 is YES), the conference support apparatus 2 performs the notification processing (step S22). Through this notification processing, it is notified that the psychological safety has decreased during the conference. The conference support apparatus 2 identifies the participant to whom the notification is to be provided, and provides the notification to the information processing terminal of the identified participant. Thus, the participant who has received the notification can make an action to enhance the psychological safety of the other participants. The notification processing performed in step S22 is continuously performed until it is released in following step S24.

When none of the evaluation values is equal to or smaller than the predetermined value (when a result of step S21 is NO), the conference support apparatus 2 determines whether the notification processing is being performed at the present time (step S23). When the notification processing is being performed (when a result of step S23 is YES), the conference support apparatus 2 releases the notification processing (step S24). To be more specific, the notification processing started in step S22 is continued until the evaluation value representing the psychological safety becomes higher than the predetermined value. In other words, the notification processing is continued while the evaluation value representing the psychological safety is equal to or smaller than the predetermined value. Thus, it is possible to prevent the conference from proceeding in a state in which the psychological safety being decreased. When the notification processing is not being performed in step S23, the process in step S24 is skipped.

The conference support apparatus 2 then determines whether the conference ends (step S25). If the conference continues (when a result of step S25 is NO), the processing by the conference support apparatus 2 returns to step S10 to repeat the above-described processing. When the conference ends (when a result of step S25 is YES), the processing performed by the conference support apparatus 2 ends.

As described above, the processor 5 executes the program 7 so that the conference support apparatus 2 of the present embodiment performs two types of steps. The first step is an acquisition step (step S10) of acquiring the information D10 on the behaviors of the participants A, B, and C of the conference. The second step is an evaluation step (steps S11 to S20) of evaluating the psychological safety of the participants A, B, and C based on the information D10 acquired in the acquisition step during the conference. Hence, when the psychological safety of the participant A, B, or C decreases during the conference, the conference support apparatus 2 of the present embodiment can appropriately detect the decrease.

The conference support apparatus 2 may determine in the evaluation step that the psychological safety of the participant of the conference has decreased. In that case, the conference support apparatus 2 further performs a notification step (steps S21 to S22) of providing a notification to the participant of the conference. Therefore, the participant of the conference can understand that the psychological safety has decreased during the conference by the notification from the conference support apparatus 2. As a result, the participant who has received the notification can activate the conference by performing a behavior for enhancing the psychological safety.

(Modifications)

While the preferred embodiment of the present invention has been described above, the present invention is not limited to the preferred embodiments. Various modifications may be applied to the present invention In the above-described preferred embodiment, for example, it is explained that the conference support apparatus 2 provides a notification to each participant A, B, and C when the psychological safety decreases during the conference. However, it is not essential that the conference support apparatus 2 provides a notification to each participant A, B, and C when detecting that the psychological safety has decreased during the conference. For example, the conference support apparatus 2 may only record a change in the psychological safety during the conference in the conference information 14 as a log. To be more specific, the conference support apparatus 2 may not include the function of the notification unit 13 described above.

In the above-described preferred embodiment, for example, it is explained that the conference support apparatus 2 identifies the emotion based on the behavior of each of the participants A, B, and C and calculates the evaluation value corresponding to the emotion. However, it is not essential for the conference support apparatus 2 to identify the emotion based on the behavior of each of the participants A, B, and C. That is, the conference support apparatus 2 may directly calculate an evaluation value representing the psychological safety based on the behavior of each of the conference participants A, B, and C. In this case, for example, when the behavior of each of the participants A, B, and C is analyzed using AI, the evaluation value corresponding to the behavior of each of the participants A, B, and C can be calculated with high accuracy.

In the above-described embodiment, as an example of the evaluation value, the evaluation value decreases when the psychological safety decreases and the evaluation value increases in a case where the psychological safety increases. However, the invention is not limited thereto. The value that increases when the psychological safety decreases and decreases when the psychological safety increases may be employed as the evaluation value.

In the above-described embodiment, the conference support apparatus 2 calculates two types of evaluation values. One is, the evaluation value representing the psychological safety of the whole conference and another is the evaluation value representing the psychological safety of each of the participants A, B, and C. However, the present invention is not limited thereto. The conference support apparatus 2 may calculate only one type of evaluation value.

Moreover, the content of the notification by the notification unit 13 described in the above-described embodiment is an example. The notification unit 13 may provide a notification different from the aforementioned notification. For example, when the evaluation unit 12 detects a participant who has been silent for a predetermined time or longer, the notification unit 13 may provide a notification prompting the silent participant to speak to another participant. Furthermore, since the emotion of each participant is identified by the evaluation unit 12, it is also possible to determine whether there is a participant who is not satisfied with the content of the conference. When the notification unit 13 detects a participant who is not satisfied with the content of the conference, the notification unit 13 may provide a notification to another participant to find out the question of the participant.

Figure 12A:
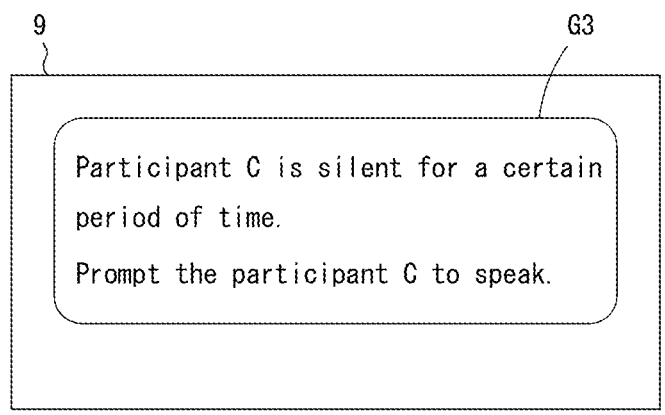
FIG. 12A illustrates another screen example displayed on the display part of the information processing terminal.
Figure 12B:
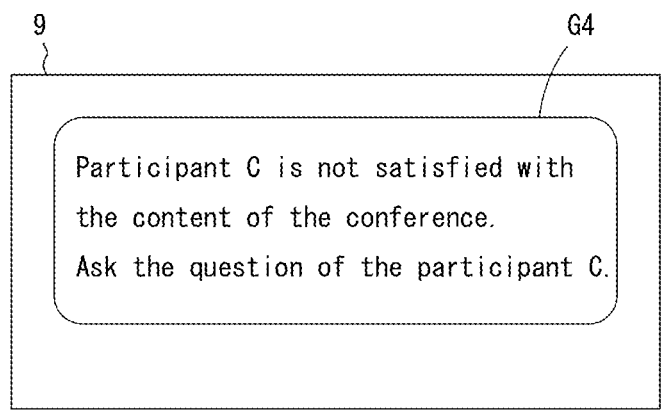
FIG. 12B illustrates another screen example displayed on the display part of the information processing terminal.

FIGS. 12A and 12B illustrate an example of a screen displayed on the display unit 9 of each of the information processing terminals 3*a*, 3*b*, and 3*c* in response to such a notification. A screen G3 illustrated in FIG. 12A illustrates an example of a notification screen in a case where the participant C is silent for a certain period of time or longer. When the participant C is silent for the predetermined period of time or longer, the screen G3 is displayed on the information processing terminals 3*a* and 3*b* of the other participants A and B. The participants A and B who have received the notification can then perform a behavior of prompting the participant C to speak. A screen G4 illustrated in FIG. 12B illustrates an example of a notification screen in a case where a participant who is not satisfied with the content of the conference is detected. If the participant C is not satisfied with the content of the conference, the screen G4 is displayed on the information-processing terminals 3*a* and 3*b* of the other participants A and B. After receiving the notification, the participants A and B can ask the question of the participant C. That is, the screens G3 and G4 as illustrated in FIGS. 12A and 12B are displayed so that the conference can be further activated.

Figure 13:
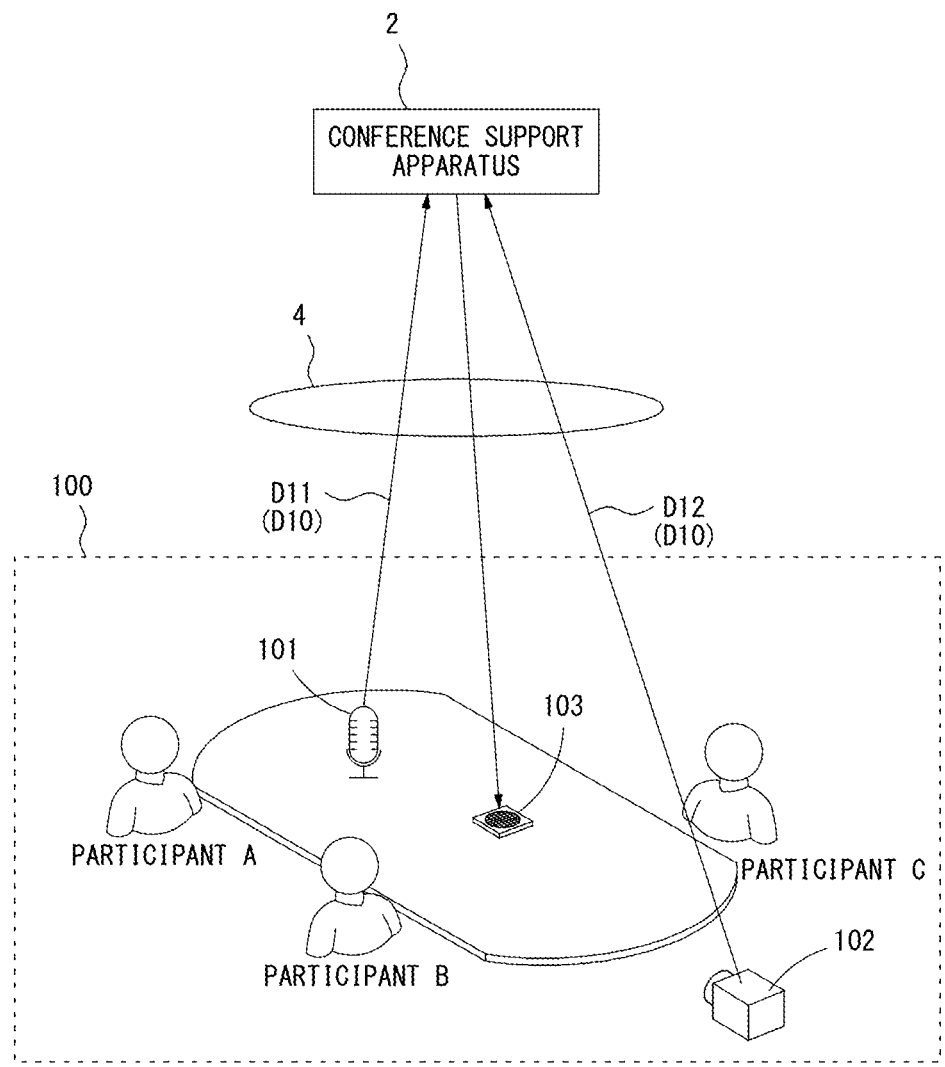
FIG. 13 illustrates another exemplary configuration of the conference system.

Furthermore, in the above-described embodiment, each of the participants A, B, and C has the respective information processing terminals 3*a*, 3*b*, and 3*c* and is participating in the conference. However, the participants A, B, and C may not necessarily bring the information processing terminals 3*a*, 3*b*, and 3*c* into a conference room 100. FIG. 13 illustrates an example of the conference system 1 different from that of FIG. 1. In the conference system 1, a microphone 101, a camera 102, and a speaker 103 are installed in the conference room 100. The conference support apparatus 2 acquires the information D10 on the behavior of the participants A, B, and C from the microphone 101 and the camera 102 installed in the conference room 100. Upon determining that the psychological safety has decreased during the conference, the conference support apparatus 2 drives the speaker 103 installed in the conference room 100 to notify the participants A, B, and C that the psychological safety has decreased. When a display unit is installed in the conference room 100, the conference support apparatus 2 may display the above-described notification screen on the display unit. That is, in the conference system 1, even when the participants A, B, and C do not bring the information processing terminals 3*a*, 3*b*, and 3*c*, it is possible to evaluate the psychological safety during the conference.

Figure 14:
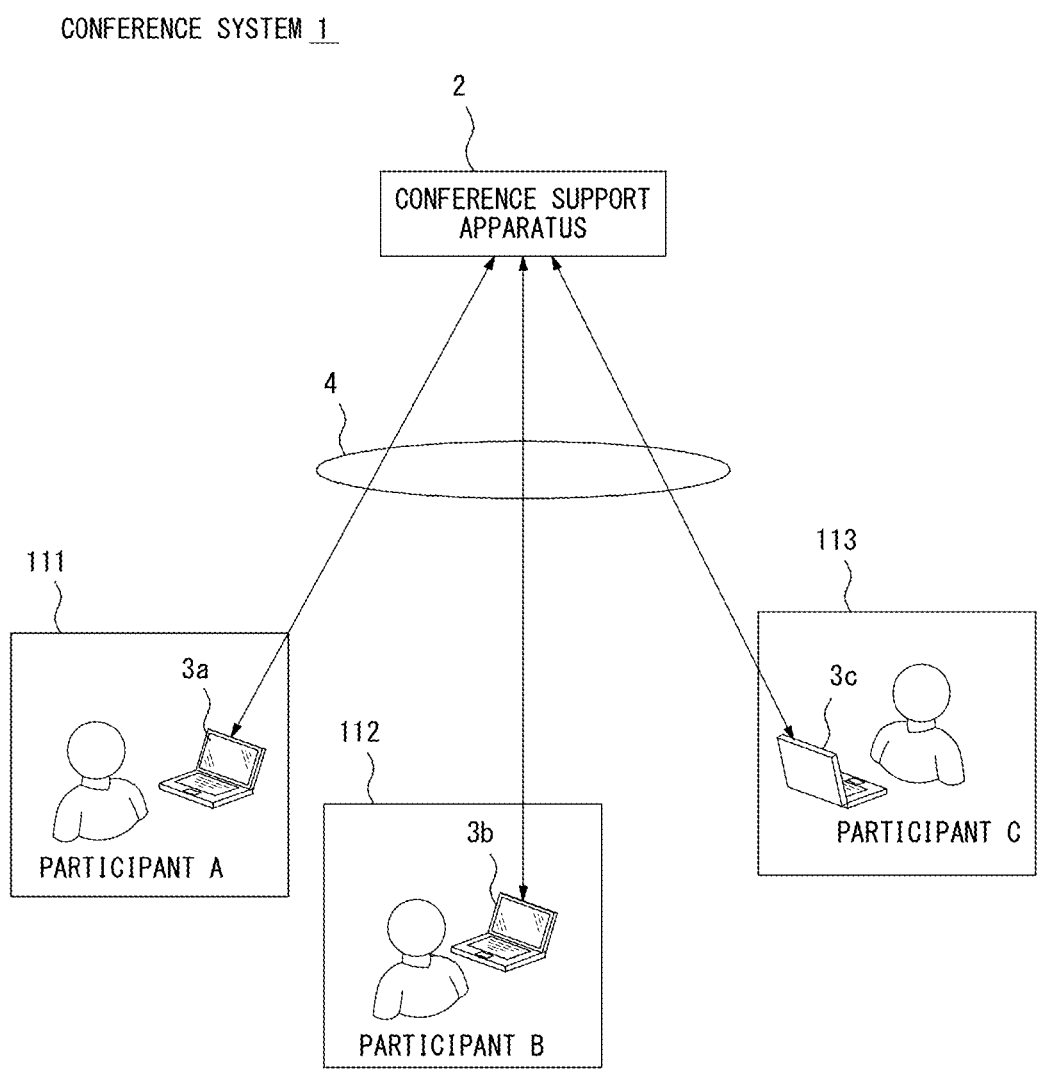
FIG. 14 illustrates the other exemplary configurations of the conference system.

Furthermore, the example in which the multiple participants A, B, and C gather in the single conference room 100 to hold the conference has been described in the above-described embodiment. However, this is just an example. For example, as illustrated in FIG. 14, multiple participants A, B, and C may access the conference support apparatus 2 from different locations 111, 112, and 113, respectively, to hold a remote conference. In this case, the conference support apparatus 2 can acquire information D10 on the respective behaviors from the information processing terminals 3*a*_3*b* and 3*c* of the participants A, B, and C to evaluate the psychological safety.

The conference support apparatus 2 is configured as a device different from the information processing terminals 3*a*, 3*b* or 3*c* in the above embodiment. However, the conference support apparatus 2 may be formed as at least one of the multiple terminals 3*a*, 3*b*, and 3*c*. In this case, the aforementioned program 7 is executed by the information processing terminal that functions as the conference support apparatus 2.

What is claimed is:

1. A control method of a conference system, comprising:
acquiring information on behavior of a participant in a conference; and
evaluating, during the conference, psychological safety of the participant based on the acquired information;
wherein a voice information of the participant is acquired as the information on the behavior of the participant;
wherein when the silent time during which the voice information is not acquired is equal to or longer than a predetermined time, it is determined whether or not the psychological safety of the participant has decreased based on the voice information acquired immediately before the silent time.

2. The control method according to claim 1, wherein the voice information is analyzed to identify an emotion of the participant, and the psychological safety of the participant is evaluated based on the identified emotion.

3. The control method according to claim 2, wherein the emotion of the participant is identified by analyzing a content and a tone of the voice included in the voice information.

4. The control method according to claim 3, wherein the emotion of each of multiple participants is identified.

5. The control method according to claim 2, wherein an evaluation value corresponding to the identified emotion is calculated, and it is determined that the psychological safety of the participant has decreased when the evaluation value becomes equal to or smaller than a predetermined value.

6. The control method according to claim 2, wherein an analysis result of the voice information is accumulated and stored in a predetermined storage, and
when new voice information is acquired in response to the participant's speech, the psychological safety of the participant is evaluated based on both of: the analysis result of the new voice information; and a past analysis result stored in the storage.

7. The control method according to claim 6, wherein the analysis result within a predetermined time from a predetermined time before the participant makes a new speech to a current time is used as the past analysis result.

8. The control method according to claim 1, wherein image information obtained by capturing an image of the participant is acquired as the information on the behavior of the participant.

9. The control method according to claim 8, wherein the image information is analyzed to identify the emotion of the participant, and the psychological safety of the participant is evaluated based on the identified emotion.

10. The control method according to claim 1, further comprising:
providing a notification to the participant when it is determined that the psychological safety of the participant has decreased.

11. The control method according to claim 10, wherein notifications are provided to all of the multiple participants.

12. The control method according to claim 10, wherein notifications are provided to a specific participant among the multiple participants.

13. The control method according to claim 10, wherein the notification is provided to the participants other than the participant determined as having the decreased psychological safety among the multiple participants.

14. The control method according to claim 13, wherein the notification including information indicating the participant whose psychological safety has been determined to have decreased is provided.

15. The control method according to claim 13, wherein the notification for prompting the participant whose psychological safety is determined to have decreased to speak is provided.

16. A control method of a conference system, comprising:
acquiring information on behavior of a participant in a conference; and
evaluating, during the conference, psychological safety of the participant based on the acquired information;
wherein a voice information of the participant is acquired as the information on the behavior of the participant; and
wherein it is determined that the psychological safety of the participant has decreased when a silent period during which the voice information is not acquired is equal to or longer than a predetermined period of time.

17. A conference system, comprising
an acquisition unit that acquires information on behavior of a participant in a conference; and
an evaluation unit that evaluates psychological safety of the participant based on the information acquired by the acquisition unit during the conference;
wherein a voice information of the participant is acquired as the information on the behavior of the participant;
wherein when the silent time during which the voice information is not acquired is equal to or longer than a predetermined time, it is determined whether or not the psychological safety of the participant has decreased based on the voice information acquired immediately before the silent time.

18. A non-transitory recording medium storing a computer readable program to be executed by a hardware processor in a computer, the computer readable program causes the hardware processor executing the computer readable program to:
acquiring information on behavior of a participant in a conference; and
evaluating psychological safety of the participant based on the acquired information during the conference;
wherein a voice information of the participant is acquired as the information on the behavior of the participant;
wherein when the silent time during which the voice information is not acquired is equal to or longer than a predetermined time, it is determined whether or not the psychological safety of the participant has decreased based on the voice information acquired immediately before the silent time.

19. A control method of a conference system, comprising:
acquiring information on behavior of a participant in a conference; and
evaluating, during the conference, psychological status of the participant based on the acquired information;
wherein a voice information of the participant is acquired as the information on the behavior of the participant; and
wherein the psychological status of the participant is determined based on a silent period during which the voice information is not acquired and the voice information acquired immediately before the silent period.

* * * * *